(12) United States Patent
Doumaux et al.

(10) Patent No.: US 10,696,856 B2
(45) Date of Patent: Jun. 30, 2020

(54) INK COMPOSITION

(71) Applicant: Hewlett-Packard Development Company, L.P., Fort Collins, CO (US)

(72) Inventors: Howard Doumaux, San Diego, CA (US); Max Yen, San Diego, CA (US); Thomas W. Butler, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 424 days.

(21) Appl. No.: 15/109,721

(22) PCT Filed: Jan. 22, 2014

(86) PCT No.: PCT/US2014/012468
§ 371 (c)(1),
(2) Date: Jul. 5, 2016

(87) PCT Pub. No.: WO2015/112129
PCT Pub. Date: Jul. 30, 2015

(65) Prior Publication Data
US 2016/0326391 A1 Nov. 10, 2016

(51) Int. Cl.
*C09D 11/38* (2014.01)
*C09D 11/10* (2014.01)
*C09D 11/037* (2014.01)
*C09D 11/322* (2014.01)
*C09D 11/102* (2014.01)
*C09D 11/033* (2014.01)
*C09D 11/105* (2014.01)

(52) U.S. Cl.
CPC ............ *C09D 11/38* (2013.01); *C09D 11/033* (2013.01); *C09D 11/037* (2013.01); *C09D 11/10* (2013.01); *C09D 11/102* (2013.01); *C09D 11/105* (2013.01); *C09D 11/322* (2013.01)

(58) Field of Classification Search
CPC .................................................... C09D 11/38
See application file for complete search history.

(56) References Cited

U.S. PATENT DOCUMENTS

| 4,844,742 A | 7/1989 | Jaffe |
| 5,286,863 A * | 2/1994 | Babler ................ C09B 67/0027 106/497 |
| 5,889,083 A * | 3/1999 | Zhu ........................ C09D 11/30 523/161 |
| 7,632,346 B2 | 12/2009 | Deroover |
| 8,084,091 B2 | 12/2011 | Deroover et al. |
| 8,362,137 B2 | 1/2013 | Yasuda |
| 2003/0019398 A1 | 1/2003 | Komatsu et al. |
| 2005/0166798 A1* | 8/2005 | Babler ................ C09B 67/0022 106/413 |
| 2006/0194897 A1 | 8/2006 | Kawabe et al. |
| 2007/0259120 A1 | 11/2007 | Haubennestel et al. |
| 2010/0277526 A1* | 11/2010 | Chen .................... C09D 11/326 347/9 |
| 2012/0140001 A1 | 6/2012 | Birau et al. |
| 2012/0200634 A1 | 8/2012 | Deroover |
| 2014/0015912 A1* | 1/2014 | Brandstein ............. C09D 11/30 347/110 |

FOREIGN PATENT DOCUMENTS

| EP | 1672039 | 6/2006 |
| EP | 2316889 | 5/2011 |
| EP | 2604658 | 6/2013 |
| JP | H1095946 | 4/1998 |
| JP | 2007063407 | 3/2007 |
| WO | 2012131668 | 10/2012 |

OTHER PUBLICATIONS

Machine translation of JPH1095946. (Year: 1998).*
International Search Report dated Oct. 22, 2014 for PCT/US2014/012468, Applicant Hewlett-Packard Development Company, L.P.

* cited by examiner

*Primary Examiner* — Wenwen Cai
(74) *Attorney, Agent, or Firm* — Thorpe North & Western LLP

(57) ABSTRACT

An ink composition is described herein. In one example, an ink includes at least one pigment, at least one dispersant, and at least one durable polymer in a water-based dispersion medium including at least one hydrophilic solvent. The dispersant is present at from about 0.05 wt % to about 15 wt % of the ink composition. Further, the ink composition includes at least one dispersion additive.

29 Claims, No Drawings

INK COMPOSITION

BACKGROUND

Inkjet printing is a non-impact process of printing text or images by delivering and positioning precise small volumes of fluid with diverse chemical and physical properties on a substrate. Apart from document printing, the technique has been successfully applied in the areas of electronics, mechanical engineering, and life sciences.

The inkjet ink includes an ink vehicle and a colorant, such as a dye or a pigment. Dyes are more commonly used in inkjet inks, however, text or images printed with dye-based inkjet inks are generally less resistant to light, and water. On the other hand, pigment-based inkjet inks provide printed text or images having improved resistance to light, and water. While pigment-based inkjet inks have these desirable properties, they are significantly more difficult to formulate than dye-based inks. It is not easy to keep the pigment particles suspended in the ink matrix and prevent them from aggregating. This may not always have been observed for dye-based inks, as the dyes typically utilized in inkjet printing are substantially soluble in the ink matrix.

DETAILED DESCRIPTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively, and any and all combinations of any or more of such steps or features.

DEFINITIONS

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "pigment" means a coloring substance that is usually insoluble in the application medium.

The term "colorant" means a substance that give color to the objects which contain them.

The term "dye" means a soluble or insoluble coloring matter.

The term "dispersing medium" or "liquid vehicle" refers to a fluid in which pigments are dispersed to form ink-jettable inkjet inks in accordance with the present disclosure. Dispersing medium may include a mixture of a variety of different agents, such as surfactants, co-solvents, buffers, biocides, complexing agents, viscosity modifiers, and water.

The term "mixed crystal" means a solid, homogeneous mixture of two or more constituents, which may vary in composition between certain limits and remain homogeneous.

The term "composition" and "formulation" are used to refer to a result or product of composing: a mixture or compound according to a formula. Further, "composition" and "formulation" are used interchangeably.

The term "alkyl" refers to a monoradical branched or unbranched saturated hydrocarbon chain having from 1 to 22 carbon atoms. This term is exemplified by groups, such as methyl, ethyl, n-propyl, iso-propyl, n-butyl, iso-butyl, t-butyl, n-hexyl, n-decyl, tetradecyl, and the like. By way of further example, a $C_1$-$C_{20}$ alkyl contains at least one but no more than 20 carbon atoms. A methyl group (i.e., $CH_3$—) is an example of a $C_1$ alkyl radical. A dodecyl group (i.e., $CH_3(CH_2)_{11}$—) is an example of a $C_{12}$ alkyl radical.

It will be understood that "substitution" or "substituted with" includes the implicit proviso that such substitution is in accordance with permitted valence of the substituted atom and the substituent, and that the substitution results in a stable compound, e.g., which does not spontaneously undergo transformation, such as by rearrangement, cyclization, elimination, etc.

As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. Illustrative substituents include, for example, those described herein above. The permissible substituents can be one or more and the same or different for appropriate organic compounds. For purposes of this disclosure, the heteroatoms, such as nitrogen may have hydrogen substituents and/or any permissible substituents of organic compounds described herein which satisfy the valences of the heteroatoms.

The term "substituted alkyl" refers to an alkyl group as defined above, having 1 to 10 substituents, selected from the group consisting of alkyl, aryl, halogen, cyano, sulphonic acid or salts thereof, and carboxylic acid or salts thereof.

"Halo" or "Halogen", alone or in combination with any other term means halogens, such as chloro (CI), fluoro (F), bromo (Br), and iodo (I).

The term "aryl" refers to an aromatic carbocyclic group of 6 to 10 carbon atoms having a single ring or multiple rings, or multiple condensed (fused) rings.

The term "substituted aryl" refers to an aryl group as defined above having 1 to 4 substituents, selected from the group consisting of alkyl, aryl, halogen, cyano, sulphonic acid or salts thereof, and carboxylic acid or salts thereof.

As used herein, the term "aromatic radical" includes but is not limited to, phenyl, pyridyl, furanyl, thienyl, naphthyl, phenylene, and biphenyl radicals. As noted, the aromatic radical contains at least one aromatic group.

The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), and anthraceneyl groups (n=3). The aromatic radical may also include non-aromatic components.

For example, benzyl ($C_6H_5CH_2$—), naphthyl-1-methyl ($C_{10}H_7CH_2$—), and anthracenyl-1-methyl ($C_{14}H_9CH_2$—) are aromatic radicals, that comprise a phenyl ring, a naphthyl ring, an anthracenyl ring (the aromatic group) respectively and a methylene group (the non-aromatic component). Similarly a tetrahydronaphthyl radical is an aromatic radical comprising an aromatic group ($C_6H_3$) fused to a non-aromatic component —$(CH_2)_4$—. For convenience, the term "aromatic radical" is defined herein to encompass a wide range of functional groups, such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example, carboxylic acid derivatives, such as esters and amides), amine groups, nitro groups, and the like.

The term "cycloalkyl" refers to carbocyclic groups of from 3 to 22 carbon atoms having a single cyclic ring or multiple condensed rings that may be partially unsaturated.

The term "heteroaryl" refers to an aromatic cyclic group having 4 to 10 carbon atoms and having heteroatoms selected from oxygen, nitrogen, and sulfur within at least one ring (if there is more than one ring). Such heteroaryl groups can have a single ring (e.g. pyridyl or furyl) or multiple condensed rings (e.g. indolizinyl, benzothiazolyl, or benzothienyl).

The terms "hydrophilic" and "hydrophobic" are art-recognized and mean water-loving and water-hating, respectively. In general, a hydrophilic substance will dissolve in water, and a hydrophobic one will not.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 0.05 wt % to about 15 wt % should be interpreted to include not only the explicitly recited limits of about 0.05 wt % to about 15 wt %, but also to include sub-ranges, such as 0.05 wt % to 1 wt %, 7 wt % to 15 wt %, and so forth, as well as individual amounts, including fractional amounts, within the specified ranges, such as 0.5 wt %, 1.1 wt %, and 2.9 wt %, for example.

As discussed above, inkjet printing is a non-impact process of printing text or images by delivering and positioning precise small volumes of fluid with diverse chemical and physical properties on a substrate. The print quality delivered by a inkjet printhead depends on the properties of a jetted drop, such as the drop velocity, the jetting direction and the drop volume. The pigments form discrete particles that clump or agglomerate if they are not stabilized in the inkjet ink and may cause print defects when used for inkjet printing.

Transient and permanent resistor fouling are some failure mechanisms of inkjet ink formulation. Transient resistor fouling causes the nozzles to become "tired" upon repeated firing, which reveals itself as a reduction in drop velocity, drop weight and/or poor drop shape on the substrate, which recovers over time without ink being fired. Permanent resistor fouling shows reduced drop weight, drop velocity, and/or poor drop shape on the substrate. This defect does not recover with time. Examination of permanently fouled resistor typically shows a build-up of material on the resistor. In some cases, the build-up of material on the resistor may also arise from the smaller characteristic size of thermal inkjet jetting chambers and nozzles.

The ink composition according to the present disclosure provide printed images having a high print quality by allowing removal of print defects. Further, pigments dispersed in the ink composition exhibit enhanced dispersibility and dispersion stability.

The ink composition according to the present disclosure includes (a) a dispersion medium; (b) at least one pigment dispersed in the dispersion medium; (c) at least one dispersant; (d) at least one durable polymer; and (e) at least one dispersion additive. The inks of the present disclosure may include a dispersed wax.

In one non-limiting example, the ink composition includes (a) a dispersion medium; (b) at least one pigment dispersed in the dispersion medium; (c) at least one dispersant; (d) at least one durable polymer; (e) a wax dispersed in the dispersion medium; and (f) at least one dispersion additive.

In one implementation, the ink composition includes: a dispersion medium, wherein the dispersion medium is water-based and contains at least one hydrophilic solvent; at least one pigment dispersed in the dispersion medium; at least one dispersant, wherein the at least one dispersant is present at from about 0.05 wt % to about 15 wt % of the ink composition; at least one durable polymer; and at least one dispersion additive, wherein the at least one dispersion additive is a quinacridone derivative according to Formula I,

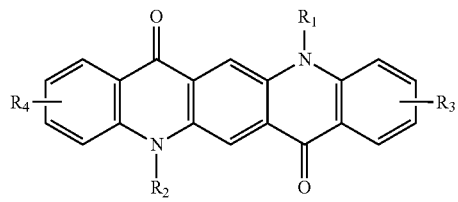

Formula I wherein $R_1$ and $R_2$ are independently hydrogen; $R_3$ and $R_4$ are independently selected from the group consisting of hydrogen, alkyl, halogen, sulphonic acid or salts thereof, carboxylic acid or salts thereof, and the group -A-B; A is selected from the group consisting of alkyl and aryl; B is selected from the group consisting of alkyl, aryl, heteroaryl, cycloalkyl, heterocycloalkyl, —$NHCOR_5$; $R_5$ is selected from the group consisting of alkyl and aryl; wherein alkyl, aryl, heteroaryl, cycloalkyl, heterocycloalkyl and $R_5$ are independently further substituted or unsubstituted with alkyl, aryl, halogen, cyano, sulphonic acid or salts thereof, carboxylic acid or salts thereof.

The ink composition according to the present disclosure includes at least one pigment. The pigments may be stably dispersed in the dispersion medium due to the function of the dispersant, durable polymer, and the dispersant additive that is described below. In one implementation, the pigments may include: carbon black, an organic pigment, a white inorganic pigment, a colored inorganic pigment, and a mixed crystals thereof.

Mixed crystals are also known as solid solutions. The molecules of the components, in a solid solution, enter into the same crystal lattice, usually, but not always, that of one of the components. The X-ray diffraction pattern of the mixed crystal is characteristic of that solid and can be clearly differentiated from the pattern of a physical mixture of the same components in the same proportion.

The pigment may be a black pigment. In one implementation, the pigment may include blue, black, brown, cyan, green, white, violet, magenta, red, yellow pigment, and a mixed crystal thereof. Further, mixtures of colored pigments may be used in the inkjet ink, as well as mixtures of black and colored pigments.

Examples of inorganic pigments may include, but is not limited to, iron oxide, titanium oxide, zinc oxide, zinc sulphides, zinc chromate, zirconium oxide, iron blue, ultramarine blue, chromium oxide, ultramarine, cobalt blue, cobalt violet, silicon dioxide, nickel oxides, aluminium oxides, ferric ferrocyanide (Prussian blue), lead chromate, white lead, basic lead sulfate, cadmium yellow, chrome yellow, barium sulfate, calcium carbonate, calcium silicate, manganese violet, and a mixed crystal thereof. In one particular embodiment, the pigment is a carbon black or an organic pigment.

In one implementation, the pigment may be a carbon black pigment, such as a channel black, a furnace black, or a lamp black. The carbon black may include, but is not limited to, Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, and Vulcan® P. Other carbon blacks include, but are not limited to, Printex 40, Printex 80, Printex 300, Printex L, Printex U, Printex V, Special Black 4, Special Black 5, FW1, FW2, FW18, and FW200, Raven 780, Raven 890, Raven 1020, Raven 1040, Raven 1255, Raven 1500, Raven 5000, Raven 5250, and mixed crystals thereof.

In one implementation, the pigment may be anthraquinones, phthalocyanine blues, phthalocyanine greens, diazos, monoazos, pyranthrones, perylenes, heterocyclic yellows, quinacridones, (thio) indigoids, and a mixed crystal thereof. Such pigments are commercially available in powder, press cake, or dispersion form from a number of sources.

Specific examples of phthalocyanine blues may include copper phthalocyanine blue, and derivatives thereof (Pigment Blue 15, 15:1, 15:2 15:3, 15:4, 15:6, Pigment Green 7, and Pigment Green 36). In one implementation, the pigment is selected from the group consisting of quinacridone pigment and quinacridonequinone pigment. In another implementation, the pigment is selected from the group consisting of Pigment Orange 48, Pigment Orange 49, Pigment Red 122, Pigment Red 192, Pigment Red 202, Pigment Red 206, Pigment Red 207, Pigment Red 209, Pigment Red 282, Pigment Violet 19, Pigment Violet 42, and a mixed crystal thereof. The above list of pigments includes polymorphic forms of unmodified pigment particulates, and modified pigment particulates. The pigment particulates may be modified with organic or inorganic molecules in order to control crystal growth/shape during the process of preparing ink compositions. In one implementation, the pigment may be a solid solution of quinacridone or quinacridonequinone pigments described above.

Examples of anthraquinones can be Pigment Red 43, Pigment Red 194, Pigment Red 216 or Pigment Red 226. Examples of perylenes include Pigment Red 123, Pigment Red 149, Pigment Red 179, Pigment Red 190, Pigment Violet 19, Pigment Red 189, Pigment Red 224, and mixed crystals thereof. Examples of thioindigoids include Pigment Red 86, Pigment Red 87, Pigment Red 88, Pigment Red 181, Pigment Red 198, Pigment Violet 36, and Pigment Violet 38.

Examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 93, Pigment Yellow 151, Pigment Yellow 154, Pigment Yellow 155, Pigment Yellow 117, Pigment Yellow 128, Pigment Yellow 138, Pigment Yellow 109, Pigment Yellow 110, Pigment Yellow 213, and mixed crystals thereof. The above mentioned pigments are commercially available from a number of sources including, BASF Corp., Engelhard Corp., Dianippon Ink and Chemicals, Toyo Ink Group, Dainichiseika Color & Chemicals Manufacturing Co. Ltd., Clariant Corp. and Sun Chemical Corp.

Solid pigment particles intended normally to impart color to the ink, are generally dispersed in an aqueous medium (e.g. dispersant medium). Selection of one or more of these pigments described above, may determine the color of the ink that will ultimately be formed. In an example, the inkjet ink may be formed as a yellow ink, a magenta ink, a cyan ink, a black ink, a brown ink, a red ink, a blue ink, a green ink, a violet ink, an orange ink, a white ink, a metallic ink, a neutral gray ink or a non-neutral gray ink.

The particle size has an influence on the pigment dispersion stability, which is one of the significant factors which determine the print quality of the images. The dispersed pigment particles in the formulated ink are sufficiently small to permit free flow of the ink through the inkjet printing device. Small pigment particles impart high chroma and transparency to the inks which are desirable properties for excellent color gamut. The particles have a tendency to agglomerate in the vehicle, thus, resulting in increase of particle size of the pigments.

Typically, the pigment particle size is between 5 nm and 500 nm. Pigment particle sizes outside this range can be used if the pigment can remain dispersed and provide acceptable printing properties. In one aspect, the pigment particle is between 10 nm to 250 nm in size. In another aspect, the pigment particle size is no larger than 150 nm.

In one implementation, the pigment is present in an amount ranging from 0.3 wt % to 20 wt % of the ink composition. In another implementation, the pigment is present in an amount ranging from 3 wt % to 5 wt % of the ink composition. In yet another implementation, the pigment is present in an amount ranging from 10 wt % to 15 wt % of the ink composition. In light of desirable stability as dispersion coloring material, the content of the pigment is less than 20 wt % of the ink composition. The pigments may be chemically modified in a variety of ways using a dispersant to increase their dispersion stability. The dispersant used in the ink composition is given below.

The ink composition according to the present disclosure includes at least one dispersant. Dispersant is a substance that aids in dispersion of, and/or associates with a surface of at least some of the pigment(s) particles. The dispersant may get adsorbed on the pigment surface and help in the stabilization of the pigment in the dispersion medium. The dispersant adsorbed on the pigment surface provides an electric double layer and/or a steric layer to the pigment surfaces to prevent or minimize coagulation of the pigment in the dispersion medium or the vehicle. The ink composition includes encapsulated pigment dispersed throughout the dispersant medium.

The properties of dispersants depend on both the nature of the monomers and their distribution in the polymer. The dispersant can be selected using a variety of parameters including, but not limited to molecular weight, acid number, polymer structure, and/or the type of monomers. Some non-limiting examples of dispersants are styrene-acrylic resins/polymers/copolymers, styrene-maleic anhydride resins/polymers/copolymers, acrylic resins/polymers, vinyl acetate resins/polymers, polyurethane resins/polymers, polyurethane-acrylic resins/polymers/copolymers, polyurethane-styrene-acrylic resins/polymers/copolymers and combinations thereof. Such polymeric particulates can comprise a plurality of monomers that are typically randomly polymerized, and can also be cross linked. In one implementation, random acrylic polymers or styrene-acrylic polymers can have a weight average molecular weight from 1,000 Mw to 50,000 Mw. In another implementation, polyurethane dispersants described above can have a weight average molecular weight from 5,000 Mw to 150,000 Mw. Some suitable styrene-acrylic resins are commercially available from BASF under the trademarks Joncryl® 586, Joncryl 671, Joncryl 683, and Joncryl 696. Some suitable examples of polyacrylic resins are commercially available from Lubrizol under the trademarks Carbosperse® K-702, Carbosperse® K-7600N, Carbosperse® K-7058, Carbosperse® K-7028.

In one implementation, the dispersant may be latex. The latex is a liquid suspension comprising polymeric particulates that can serve as a binder that encapsulates pigment particles and adheres to the substrate to provide stability over longer periods of time. Latex may be soluble, partially soluble, or dispersed in the ink composition. Suitable examples of monomers for latex include, but are not limited to styrene, acrylic acid, substituted acrylic acid, maleic anhydride, vinyl acetate, and/or substituted maleic anhydride.

The latexes used herein can be prepared by latex emulsion polymerization of various ratios of monomers, and, in one implementation, can have a weight average molecular weight from 1,000 Mw to 500,000 Mw. This range is just illustrative and can be broader. Typically, the latex particle size is between 5 nm and 500 nm, though sizes outside this range can be used. In one aspect, the latex particle is between 10 nm to 250 nm in size. In one implementation, latex can have a glass transition temperature from about −20 to in excess of 100° C.

Dispersants are usually added in a total quantity less than 20 wt % based on the total weight of the ink composition. In one implementation, the dispersant is present in an amount ranging from 0.05 wt % to 15 wt % of the ink composition. In another implementation, the dispersant is present in an amount of ranging from 0.1 wt % to 10 wt % of the ink composition. In yet another implementation, the pigment is present in an amount ranging from 0.1 wt % to 5 wt % of the ink composition.

As the ink composition is primarily water-based, the constituents of the composition are often water-soluble or water dispersible. Because of their water-based nature, ink systems may tend to exhibit poorer image fade and durability when exposed to water or high humidity. The ink composition may include at least one durable polymer that increases the durability of the printed article. Film durability includes smear resistance, water fastness, light fastness, rub and scratch resistance. By rub resistance, it is meant herein that the printed article is resistant to both dry and wet rub resistance. By scratch resistance, it is meant herein that the printed article is resistant to all modes of scratching which include, scuff, abrasion and burnishing.

As described above, durable polymers are materials added to the ink to increase the durability of the final print. These polymers may or may not be associated with the dispersed pigment. For ease of formulation, they may be added into the formulation separately. In the ink film it is believed that a strong interaction between the durable polymer and the pigment is involved. In one example, the molecular weight of the durable polymers ranges from 3000 Mw to 180,000 Mw. Durable polymers may include polyurethane, latex, polyurethane hybrid polymers, and combinations thereof.

Polyurethanes are synthesized from the reaction of isocyanate and polyol. Instead of using hydrocarbon polyol, environmentally friendly fluoro-diols can be used rather than or along with the hydrocarbon polyols. In one implementation, the polyurethane includes polytetramethylene glycol and isophorone diisocyanate. As used herein, "polyurethane hybrid polymer" refers to a copolymer comprising of monomers, such as acrylic, styrene, and vinyl and urethane groups. Its "hybrid" nature is analogous to an interpenetrating network of closely associated polymers obtained from the monomers described above and polyurethane polymers. This hybrid nature is structurally different from a mixture of polymer particles and polyurethane polymer particles formed by physically mixing the two polymers. In one implementation, durable polymer is selected from hybrid polyurethane-acrylic, and hybrid polyurethane-styrene-acrylic polymers. Durable polymers include latex, as described above. Thus, latex may serve the dual function of dispersant and durable polymer.

In one implementation, the durable polymer is present in an amount ranging from 0.05 wt % to 20 wt % of the ink composition. In another implementation, the durable polymer is present in an amount of ranging from 0.1 wt % to 10 wt % of the ink composition. The dispersant additive used in the ink composition is given below.

The ink composition according to the present disclosure includes at least one dispersant additive. It is understood that a mixture of dispersant additives may be used to obtain better dispersion stability. Dispersant additive or dispersant synergist is added to ink for improving the quality of the ink by enhancing its dispersibility, and dispersion stability by suppression of increase in viscosity, and particle size growth. Further, dispersant additive allow for substantial or complete removal of unstable particle content in the ink composition. Unstable particles are a potential cause of ejection-related defects in inkjet printers.

A wide variety of dispersant additives may be used in the ink composition. For example, the dispersant additive may include: unsubstituted quinacridone, substituted quinacridone, and mixed crystals thereof. Quinacridone pigments, as described above, may be used as such or with further substitutions as dispersant additives.

The dispersion additive used in the ink composition is a quinacridone compound according to Formula I:

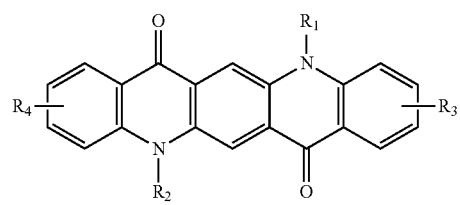

Formula I wherein $R_1$ and $R_2$ are independently hydrogen; $R_3$ and $R_4$ are independently selected from the group consisting of hydrogen, alkyl, halogen, sulphonic acid or salts thereof, carboxylic acid or salts thereof, and the group -A-B; A is selected from the group consisting of alkyl and aryl; B is selected from the group consisting of alkyl, aryl, heteroaryl, cycloalkyl, heterocycloalkyl, —NHCOR$_5$; R$_5$ is selected from the group consisting of alkyl and aryl; wherein alkyl, aryl, heteroaryl, cycloalkyl, heterocycloalkyl and R$_5$ are independently further substituted or unsubstituted with alkyl, aryl, halogen, cyano, sulphonic acid or salts thereof, carboxylic acid or salts thereof.

As described above, the counter cation of the carboxylate or sulphonate group may be selected from the group consisting of quaternary ammonium ion, alkali metals, alkaline earth metals, group III metals, and transitional metals. In one implementation, the counter cation for carboxylate or sulphonate group is selected from the group of a sodium atom and potassium atom. In another implementation, the counter cation of the carboxylate or sulphonate group is quaternary ammonium ion.

In one implementation, R$_1$, R$_2$ in the quinacridone compound according to Formula I represent hydrogen and R$_3$ and R$_4$ represent a sulphonate. In another implementation, R$_1$, R$_2$ in the quinacridone compound according to Formula I represent hydrogen and R$_3$ and R$_4$ represent a carboxylic acid or salts thereof. In yet another implementation, R$_1$, R$_2$ in the quinacridone compound according to Formula I represent hydrogen and R$_3$ and R$_4$ are selected from the group consisting of sulphonic acid, carboxylic acid and salts thereof. In yet another implementation, R$_1$, R$_2$, R$_3$ in the quinacridone compound according to Formula I represent hydrogen and R$_4$ is selected from the group consisting of sulphonic acid, carboxylic acid, and salts thereof.

In one implementation, R$_1$, R$_2$, R$_3$ in the quinacridone compound according to Formula I represent hydrogen and R$_4$ represent a group -A-B wherein A is alkyl and B is heteroaryl; wherein heteroaryl is further substituted or unsubstituted with sulphonic acid or salts thereof, carboxylic acid or salts thereof. In another implementation, R$_1$, R$_2$, R$_3$ in the quinacridone compound according to Formula I represent hydrogen and R$_4$ represent a group -A-B wherein A is alkyl and B is —NHCOR$_5$ wherein R$_5$ is aryl; and R$_5$ is further substituted or unsubstituted with sulphonic acid or salts thereof, carboxylic acid or salts thereof. In yet another implementation, wherein R$_1$ and R$_2$ in the quinacridone compound according to Formula I, are independently hydrogen; R$_3$ and R$_4$ are independently selected from the group consisting of hydrogen, C$_{1-22}$ alkyl, halogen, sulphonic acid or salts thereof, carboxylic acid or salts thereof, and the group -A-B; A is selected from the group consisting of C$_{1-22}$ alkyl and C$_{6-10}$ aryl; B is selected from the group consisting of C$_{1-22}$ alkyl, C$_{6-10}$ aryl, heteroaryl, cycloalkyl, heterocycloalkyl, —NHCOR$_5$, wherein C$_{1-22}$ alkyl, C$_{6-10}$ aryl, heteroaryl, cycloalkyl, heterocycloalkyl and R$_5$ are independently further substituted or unsubstituted with C$_{1-22}$ alkyl, C$_{6-10}$ aryl, halogen, cyano, sulphonic acid or salts thereof, carboxylic acid or salts thereof; R$_5$ is selected from the group consisting of C$_{1-22}$ alkyl and C$_{6-10}$ aryl.

The dispersion additive used in the ink composition can be a quinacridone compound according to Formula IA:

wherein R$_1$ and R$_2$ are independently hydrogen; R$_3$ and R$_4$ are independently selected from the group consisting of hydrogen, C$_{1-22}$ alkyl, halogen, sulphonic acid or salts thereof, carboxylic acid or salts thereof, and the group -A-B; A is selected from the group consisting of C$_{1-22}$ alkyl and C$_{6-10}$ aryl; B is selected from the group consisting of C$_{1-22}$ alkyl, C$_{6-10}$ aryl, heteroaryl, cycloalkyl, heterocycloalkyl, —NHCOR$_5$, wherein C$_{1-22}$ alkyl, C$_{6-10}$ aryl, heteroaryl, cycloalkyl, heterocycloalkyl and R$_5$ are independently further substituted or unsubstituted with C$_{1-22}$ alkyl, C$_{6-10}$ aryl, halogen, cyano, sulphonic acid or salts thereof, carboxylic acid or salts thereof; R$_5$ is selected from the group consisting of C$_{1-22}$ alkyl and C$_{6-10}$ aryl.

In one implementation, R$_1$, R$_2$ in the quinacridone compound according to Formula IA represent hydrogen and R$_3$ and R$_4$ represent a sulphonate. In another implementation, R$_1$, R$_2$ in the quinacridone compound according to Formula IA represent hydrogen and R$_3$ and R$_4$ represent a carboxylic acid or salts thereof. In yet another implementation, R$_1$, R$_2$ in the quinacridone compound according to Formula IA represent hydrogen and R$_3$ and R$_4$ are selected from the group consisting of sulphonic acid, carboxylic acid and salts thereof. In yet another implementation, R$_1$, R$_2$, R$_3$ in the quinacridone compound according to Formula IA represent hydrogen and R$_4$ is selected from the group consisting of sulphonic acid, carboxylic acid, and salts thereof.

In one implementation, R$_1$, R$_2$, R$_3$ in the quinacridone compound according to Formula IA represent hydrogen and R$_4$ represent a group -A-B wherein A is alkyl and B is heteroaryl; wherein heteroaryl is further substituted or unsubstituted with sulphonic acid or salts thereof, carboxylic acid or salts thereof. In another implementation, R$_1$, R$_2$, R$_3$ in the quinacridone compound according to Formula IA represent hydrogen and R$_4$ represent a group -A-B wherein A is alkyl and B is —NHCOR$_5$ wherein R$_5$ is aryl; and R$_5$ is further substituted or unsubstituted with sulphonic acid or salts thereof, carboxylic acid or salts thereof. In yet another implementation, wherein R$_1$ and R$_2$ in the quinacridone compound according to Formula IA, are independently hydrogen; R$_3$ and R$_4$ are independently selected from the group consisting of hydrogen, C$_{1-22}$ alkyl, halogen, sulphonic acid or salts thereof, carboxylic acid or salts thereof, and the group -A-B; A is selected from the group consisting of C$_{1-22}$ alkyl and C$_{6-10}$ aryl; B is selected from the group consisting of C$_{1-22}$ alkyl, C$_{6-10}$ aryl, heteroaryl, cycloalkyl, heterocycloalkyl, —NHCOR$_5$, wherein C$_{1-22}$ alkyl, C$_{6-10}$ aryl, heteroaryl, cycloalkyl, heterocycloalkyl and R$_5$ are independently further substituted or unsubstituted with C$_{1-22}$ alkyl, C$_{6-10}$ aryl, halogen, cyano, sulphonic acid or salts thereof, carboxylic acid or salts thereof; R$_5$ is selected from the group consisting of C$_{1-22}$ alkyl and C$_{6-10}$ aryl.

The following are specific examples of dispersant additives represented by Formula IA1, IA2, IA3, and IA4. However, the disclosure is not limited thereto.

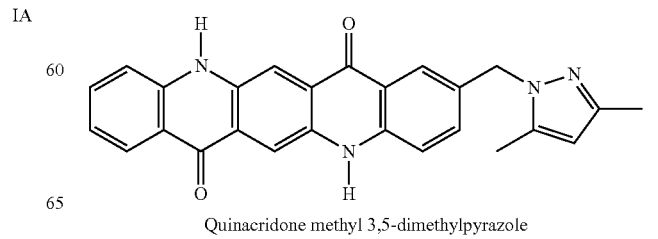

Quinacridone methyl 3,5-dimethylpyrazole

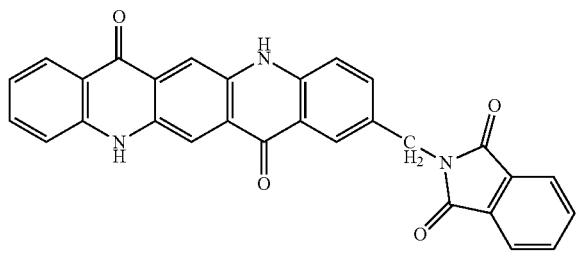

Quinacridone methyl phthalimide

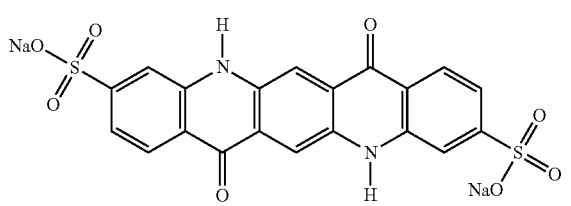

Quinacridone disodium disulfonate

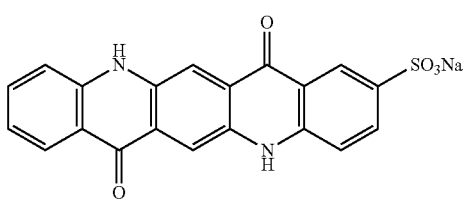

Quinacridone sodium sulfonate

In one implementation, the dispersant additive is present in an amount ranging from 0.01 wt % to 10 wt % of the ink composition. In another implementation, the dispersant additive is added in an amount ranging from 0.05 wt % to 1.2 wt % of the ink composition. In yet another implementation, the dispersant additive is present in an amount ranging from 0.5 wt % to 15 wt % of the pigment present in the ink composition. Wax used in the ink composition is given below.

The ink composition according to the present disclosure includes a wax dispersed in the dispersion medium. Waxes are materials that are or have the following properties: solid at 20° C. varying in consistency from soft and plastic to brittle and hard; a melting point of at least 40° C. without decomposing, which distinguishes waxes from oils and from natural resins; a relatively low viscosity at temperature slightly above the melting point; and non-stringing but producing droplets, which exclude most resins and plastics. A wax adds lubricity to a surface, increasing its resistance to scratching, marring, and gloss changes upon abrasion, improving its appearance in conditions where the print is subject to mechanical abrasion.

In one implementation, wax is selected from natural wax, synthetic wax, and combinations thereof. Non-limiting examples of naturally occurring waxes or wax combinations containing naturally occurring waxes include beeswax, lanolin, lancerin, shellac, ozokerite, carnauba, candelilla, jojoba, bayberry, rice bran, peat, ouricouri, monton, paraffin, and microcrystalline. Non-limiting examples of synthetic waxes include fatty acid amides, polyethylene, polypropylene, PTPE, fatty alcohols, polyamides, and combinations thereof. Some suitable wax emulsions are commercially available from Lubrizol under the trademarks Liquilube® 404, Liquilube® 405, Liquilube® 408, Liquilube® 409, and Liquilube® 411; from BASF under the trademarks Poligen® WE1, Poligen® WE3, Poligen® WE4, Poligen® WE6, Poligen® WE7, and Poligen® WE9; from Lakeland Laboratories Limited under the trademarks Lakewax® 29, Lakewax® 37, and Lakewax® 20; from Michelman under the trademarks Midchem® 93235 and Midchem® lube 190; and from Advanced Polymers Inc., under the trademark API®-188. In one implementation, wax is present in an amount ranging from 0.01 wt % to 10 wt % of the ink composition. In another implementation, the wax is added in an amount ranging from 0.05 wt % to 7 wt % of the ink composition. In yet another implementation, wax may be totally absent from the ink composition. The dispersion medium used in the ink composition is given below.

The ink composition according to the present disclosure includes a dispersion medium. As described above, the dispersing medium refers to a fluid in which pigments are dispersed to form the pigment dispersion. The dispersion medium is water based, wherein the content of water in the ink composition is more than 25 wt %. In one implementation, the content of water in the ink composition is in the range of about 30 wt % to 90 wt %. In another implementation, the content of water in the ink composition is in the range of about 50 wt % to 80 wt %. In yet another implementation, the content of water in the ink composition is in the range of about 60 wt % to 80 wt %. The ink composition may comprise of a mixture of water and at least one hydrophilic solvent.

Hydrophilic solvents include volatile and non-volatile solvents. Hydrophilic solvents having boiling point of about 285° C. or below are referred to as volatile hydrophilic solvents. In one implementation, the ink composition may comprise an aqueous liquid vehicle having one or more hydrophilic solvent. In another implementation, the ink composition may comprise an aqueous liquid vehicle having one or more hydrophilic solvent, each hydrophilic solvent having a boiling point of about 285° C. or below. The use of a non-volatile solvent (solvents having boiling point more than 285° C.) in too large of an amount can destroy the durability of the image on a non-porous substrate, especially when the solvent is a liquid at room temperature. Non-porous substrate includes surfaces that can have relatively poor water permeability, absorption, and/or adsorption. Vinyl and other plastic sheets or films, metals, coated offset media, glass, certain woods, and other similar substrates are considered to be non-porous. Thus, in one implementation, the content of non-volatile hydrophilic solvent in the ink composition is from 0.1 wt % to 2 wt %. In yet another implementation, non-volatile solvents can be absent from the ink composition. Examples of non-volatile solvents include tetraethylene glycol and glycerol polyoxyethyl ether (LEG-1). For inks targeted at semi-porous or porous paper-based substrates, higher levels of non-volatile hydrophilic solvents may be used. In one implementation, non-volatile hydrophilic solvents can be present in less 15 wt % of the ink composition.

In one implementation, the ink composition can include at least one hydrophilic solvent, wherein the content of total hydrophilic solvent is less than 40 wt %. In another implementation, the content of hydrophilic solvent in the ink composition is from 0.1 wt % to 30 wt %. In yet another implementation, the content of hydrophilic solvent in the ink composition is less than 30 wt %.

Representative examples of non-volatile solvents include ethylene glycol, di(ethylene glycol), tri/ethylene glycol), propylene glycol, di(propylene glycol), 2-pyrollidinone, n-methylpyrollidinone, 1,2-propanediol, 1,3-propanediol, 1,2-butanediol, 1,3-butanediol, 1,4-butanediol, 2,3-butanediol, 2,2-dimethyl-1,3-propanediol, 1,2-pentanediol, 2,4-pentanediol, 1,2-hexanediol, 3,5-dimethyl-3-hexyne-2,5-diol, 2,5-hexanediol, 2-methyl-2,4-pentanediol (hexyene glycol), 1,6-hexanediol, 2-ethyl-1,3-hexanediol, 2,2,4-trimethyl-1,3-pentanediol (TMPD glycol), 2,5-dimethyl-2,5 hexanediol, sulfolane, 1,4-cyclohexanedimethanol, 2,2-thiodiethanol, 3-pyridyl carbinol, propylene glycol methyl ether, dipropylene glycol methyl ether, tripropylene glycol methyl ether, propylene glycol ethyl ether, propylene glycol n-propyl ether, dipropylene glycol n-propyl ether, tripropylene glycol n-propyl ether, propylene glycol n-butyl ether, dipropylene glycol n-butyl ether, tripropylene glycol n-butyl ether, propylene glycol t-butyl ether, dipropylene glycol t-butyl ether, propylene glycol phenyl ether, ethylene glycol methyl ether, diethylene glycol methyl ether, triethylene glycol methyl ether, ethylene glycol ethyl ether, diethylene glycol ethyl ether, triethylene glycol ethyl ether, ethylene glycol n-propyl ether, ethylene glycol n-butyl ether, diethylene glycol n-butyl ether, triethylene glycol n-butyl ether, ethylene glycol n-hexyl ether, diethylene glycol n-hexyl ether, and ethylene glycol phenyl ether.

Specific examples of hydrophilic solvents include 2-hydroxyethyl-2-imidizolidinone (2HE2I), tripropylene glycol (3PG), triethylene glycol (3EG), tetraethylene glycol (4EG), 2-hydroxyethyl-2-pyrrolidone (2HE2P), 1,3-bis(2-hydroxyethyl)-5,5-dimethylhydantoin (Dantocol DHE), 1,4-pentanediol, 1,5-pentanediol, 1,2,3-hexanetriol, 1,2,6-hexanetriol, 2-ethyl-2-hydroxy-methyl-1,3-propanediol (EHPD), 2-pyrrolidinone, 2-methyl-1,3-propanediol (MPDiol), glycerol, and combinations thereof.

In addition to water and hydrophilic solvents, the dispersion medium may include surfactants, wetting agents, defoamers, complexing agents, and biocides, to improve various properties of the ink composition. In one implementation, dispersant may include surfactants. Examples of surfactants include anionic, cationic, non-ionic, and zwitter-ionic surfactants. These surfactants are chosen to be soluble in the dispersant medium. In one implementation, the surfactant can be phosphate ester-based surfactants. Specific examples include oleth-3 phosphate, oleth-10 phosphate, oleth-5 phospahte, dioleyl phosphate, ppg-5-ceteth-10 phosphate, deceth-4 phosphate, and mixtures thereof. Other specific examples by tradename include, Crodafos N3A, Crodafos N3E, Crodafos N10A, Crodafos HCE, Crodafos SG, Arlantone Map 950, Monofax 831, Monofas 1214, Monalube 215, Dextrol OC 40, Dextrol OC 60, Strodex series, Triton QS-44, Triton XQS-20, and Atlox DP13/6. In another implementation, the surfactant can be non-ionic surfactants. Specific examples of non-ionic surfactants include Tergitol® 15S-7 and Tergitol® TMN-6 by Union Carbide Co., Alfonic® 610-50R by Vista Chemical Co., Alkamuls® S by Rhone-Poulenc Co. Examples of ethoxylated non-ionic fluorosurfactant include Zonyl®FSO, Capstone® FS-31, Capstone® FS-34, and Capstone® FS-35 from DuPont, and Novec® FC-4434 from 3M Company.

Biocides are chemical substances that inhibit the growth of undesirable microorganisms. Examples of suitable biocides include benzoate salts, sorbate salts, and commercial products, such as Nuosept, Ucarcide, Vancide, Proxel, and other biocides.

Buffers may be used to maintain the ink at a desired pH. The buffer may be an organic-based biological buffer or an inorganic buffer. The buffers employed are chosen to sufficiently maintain the pH in the desired range. In one implementation, pH of the ink composition is 8.

Complexing agent or chelator includes compounds that have a chelating effect on metal ions. Complexing agents particularly include phosphonates, EDTA and NTA. Non-limiting examples of suitable complexing agents are commercially available from BASF under the trade Trilon® M, Trilon® A, and Trilon®B; from AkzoNobel under the trade name Dissolvine® GL and from Benkiesed under the trade name Calgon® T.

The ink composition may show a vivid color tone, a high coloring power, and is capable of forming a high quality image. In one implementation, neutral gray inks may be prepared from the inks disclosed in the present disclosure. The gray ink composition has predetermined effective amounts of a black pigment and at least one color pigment, such as cyan, violet, magenta, red, orange, yellow, green, or blue pigments, or combinations thereof. It is to be understood that the gray ink exhibits a hue, and that the predetermined effective amounts of the pigments may be altered to change the hue of the gray ink.

The inkjet ink may be formulated from the pigment dispersion by known methods. In one implementation, a dispersion medium, at least one pigment, at least one dispersant, and at least one dispersant additive can become admixed and pigment dispersions may be prepared using bead-milling process. In another implementation, the pigment dispersion is prepared by sheer mixing of the pigments along with other components as described above followed by milling in a horizontal bead mill. Beads may be glass, steel, or ceramic-based. In yet another implementation, the pigment dispersion is prepared by using a paint shaker or a higher quality oscillating shaker, such as a LAU disperser. After milling is completed, the pigment dispersion is separated and formulated to achieve the desired parameters for use in the inkjet printing system. The pigments dispersed in the ink composition exhibits minimal particle size growth and increase in viscosity in at least one of the following conditions: ambient storage, accelerated shelf life study at 60° C., and T-cycle testing.

The ink of the present disclosure may be present in the form of concentrated stable product. The concentrate can be diluted with a preselected diluting agent, such as water, at least one hydrophilic solvent, or a mixture of water and hydrophilic solvents, immediately prior to use. The diluted ink or the ink composition of the present disclosure may be used for ink-jetting upon substrates for a print form. Diluting before use makes the ink less expensive and deliver longer shelf life.

The ink of the present disclosure may be used in an inkjet printing process, such as a thermal, piezoelectric, drop-on-demand, or continuous inkjet printing process. To produce the printed image, the inkjet ink may be deposited on the print medium by inkjet printing techniques that are not described in detail herein.

EXAMPLES

Example 1

Synthesis of Quinacridone Derivatives

Synthesis of IA1

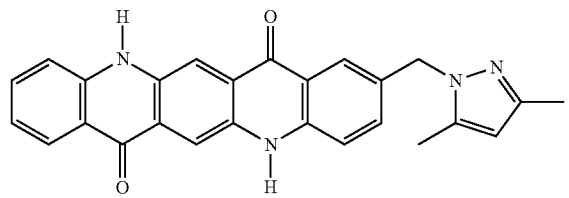

IA1

A 500 mL round-bottom flask was charged with 300 gm of concentrated sulfuric acid (96-98%). With stirring, 31 gm (0.1 mol, 1 eq) of PV19 powder known to be free of additives by LCMS analysis was slowly added in. The vessel is then chilled in an ice water bath to <10° C. and then 13.5 gm (0.11 mol, 1.1 eq) of 3,5-dimethylpyrazole was added in slowly, maintaining temperature <10° C. This was followed by addition of 3.3 gm of paraformaldehyde (0.11 mol, 1.1 eq), maintaining temperature <10° C. When addition is completed, the reaction is allowed to stir and come to room temperature for 1 hour. The reaction is heated to 45° C. and then maintained there for 2 hours. Afterwards, the vessel contents are transferred to an addition funnel and the contents are added drop wise to 4 L of rapidly stirring deionized water at <10° C. The resulting precipitate is filtered, washed, dried, pulverized, and collected to generate about 40 grams of dry red powder of structure IA1.

Synthesis of IA2

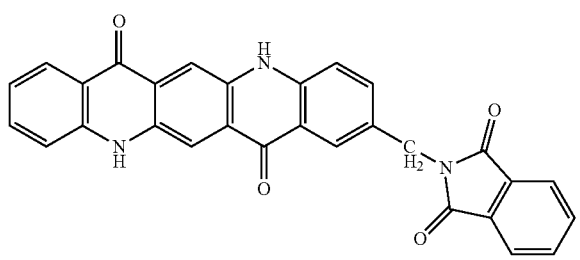

IA2

A 500 mL round-bottom flask was charged with 300 gm of concentrated sulfuric acid (96-98%). With stirring, 31 gm (0.1 mol, 1 eq) of PV19 known to be free of additives by LCMS analysis was slowly added in. The vessel is then chilled in an ice water bath to <10° C. and 19.5 gm (0.11 mol, 1.1 eq) of hydroxymethylphthalimide was added in slowly, maintaining temperature <10° C. When addition is completed, the reaction is allowed to stir and come to room temperature for 1 hour. The reaction is heated to 45° C. and then maintained there for 2 hours. Afterwards, the vessel contents are transferred to an addition funnel and the contents are added drop wise to 4 L of rapidly stirring deionized water at <10° C. The resulting precipitate is filtered, washed, dried, pulverized, and collected to generate about 43.5 grams of dry red powder of structure IA2.

Synthesis of IA3

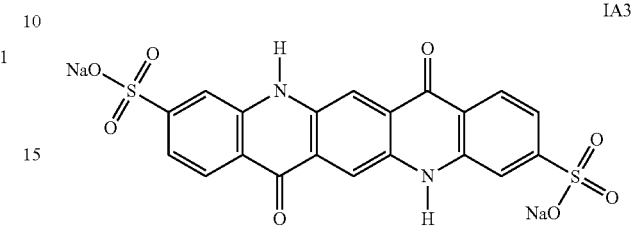

IA3

A 500 mL round-bottom flask was charged with 200 gm of concentrated sulfuric acid (96-98%). With stirring, 20 gm (0.064 mol, 1 eq) of PV19 known to be free of additives by LCMS analysis was slowly added in. The vessel was heated to 100° C. and held for 7 hours, after which it was allowed to stir without heating for an additional 18 hours. Afterwards, the vessel contents were mixed with 6 L of deionized water and then the solution was saturated with sodium chloride to precipitate out the sodium disulfonate quincridone salt. This was filtered and washed with deionized water until sodium chloride was entirely or nearly so removed, indicated by the product solubilizing in the wash water. The purified product was then collected from the filter and dried and pulverized, yielding approximately 24 gm of purple solid of structure IA3. The counter cation of IA3 may be exchanged with metal ions such as alkali metals, alkaline earth metals, transitional metals, or quaternary amine salts by using known cation exchange methods.

Synthesis of IA4

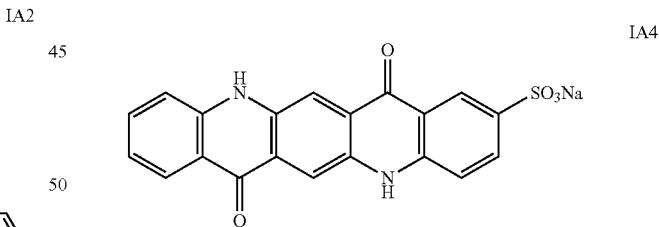

IA4

A 500 mL round-bottom flask was charged with 200 gm of concentrated sulfuric acid (96-98%). With stirring, 20 gm (0.064 mol, 1 eq) of PV19 known to be free of additives by LCMS analysis was slowly added in. The vessel was heated to 100° C. and held for 6.5 hours. Immediately after, the vessel contents were mixed with 6 L of deionized water and then the solution was saturated with sodium chloride to precipitate out the sodium disulfonate quincridone salt. This was filtered and washed with deionized water until sodium chloride was entirely or nearly so removed, indicated by the product solubilizing in the wash water. The purified product was then collected from the filter and dried and pulverized, yielding approximately 24 gm of purple solid of structure IA4.

Example 2

Preparation of Pigment Dispersions

The material IA1 (0.8 parts) was combined with Cinquasia® Magenta D 4550 J (15 parts), a 10% aqueous solution of a styrene-acrylic polymer with a reported acid number of 214 and Mw of 17,250 (15 parts), MPDiol (5 parts), and deionized water (64.2 parts). This was dispersed using bead-milling process with beads to yield pigment dispersion A. This was analyzed for UV-Vis absorbance at a 2550:1 dilution in deionized water in a 1 cm cell.

The material IA2 (0.8 parts) was combined with Cinquasia® Magenta D 4550 J (15 parts), a 10% aqueous solution of a styrene-acrylic polymer with a reported acid number of 214 and Mw of 17,250 (15 parts), MPDiol (5 parts), and deionized water (64.2 parts). This was dispersed using convention bead-milling processes with beads to yield a pigment dispersion B. This was analyzed for UV-Vis absorbance at a 2550:1 dilution in deionized water in a 1 cm cell.

Cinquasia® Magenta D 4550 J (15 parts), a 10% aqueous solution of a styrene-acrylic polymer with a reported acid number of 214 and Mw of 17,250 (15 parts), MPDiol (5 parts), and deionized water (65 parts) were combined dispersed using convention bead-milling processes with beads yield a pigment dispersion C. This was analyzed for UV-Vis absorbance at a 2550:1 dilution in deionized water in a 1 cm cell.

Cinquasia® Magenta D 4550 J (15 parts), a 10% aqueous solution of a styrene-acrylic polymer with a reported acid number of 214 and Mw of 17,250 (15 parts), MPDiol (5 parts), sulfonated ethoxylated tristyryl phenol (5 parts), and deionized water (60 parts) were combined and dispersed using convention bead-milling process with beads to yield a pigment dispersion D. This was analyzed for UV-Vis absorbance at a 2550:1 dilution in deionized water in a 1 cm cell.

The material IA1 (0.8 parts) was combined with Clariant Inkjet Magenta EO2 pigment (15 parts), a 10% aqueous solution of a styrene-acrylic polymer with a reported acid number of 214 and Mw of 17,250 (25 parts), MPDiol (5 parts), and deionized water (54.2 parts). This was dispersed using bead-milling processes with beads to yield a pigment dispersion E. This was analyzed for UV-Vis absorbance at a 2550:1 dilution in deionized water in a 1 cm cell.

The material IA2 (0.8 parts) was combined with Clariant Inkjet Magenta EO2 pigment (15 parts), a 10% aqueous solution of a styrene-acrylic polymer with a reported acid number of 214 and Mw of 17,250 (25 parts), MPDiol (5 parts), and deionized water (54.2 parts). This was dispersed using convention bead-milling processes with beads to yield a pigment dispersion F. This was analyzed for UV-Vis absorbance at a 2550:1 dilution in deionized water in a 1 cm cell.

Clariant Inkjet Magenta EO2 pigment (15 parts), a 10% aqueous solution of a styrene-acrylic polymer with a reported acid number of 214 and Mw of 17,250 (25 parts), MPDiol (5 parts), and deionized water (55 parts) were combined and dispersed using convention bead-milling processes with beads to yield a pigment dispersion G. This was analyzed for UV-Vis absorbance at a 2550:1 dilution in deionized water in a 1 cm cell.

The material IA3 (0.4 parts) was combined with Cinquasia® Magenta D 4550 J (15 parts), a 10% aqueous solution of a styrene-acrylic polymer with a reported acid number of 214 and Mw of 17,250 (5 parts), and deionized water (54.6 parts) and dispersed using convention bead-milling processes with beads to yield a pigment dispersion H. This was analyzed for UV-Vis absorbance at a 2550:1 dilution in deionized water in a 1 cm cell.

The material IA3 (0.4 parts) was combined with Cinquasia® Magenta D 4550 J (15 parts), a 10% aqueous solution of a styrene-acrylic polymer with a reported acid number of 214 and Mw of 17,250 (15 parts), MPDiol (5 parts), sulfonated ethoxylated tristyryl phenol (5 parts), and deionized water (59.6 parts) and dispersed using convention bead-milling processes with beads to yield a pigment dispersion I. This was analyzed for UV-Vis absorbance at a 2550:1 dilution in deionized water in a 1 cm cell.

The material IA2 (1.5 parts) was combined with Cinquasia® Magenta D 4550 J (15 parts), a 10% aqueous solution of a styrene-acrylic polymer with a reported acid number of 214 and Mw of 17,250 (15 parts), MPDiol (5 parts), and deionized water (63.5 parts) and dispersed using convention bead-milling processes with beads to yield a pigment dispersion J. This was analyzed for UV-Vis absorbance at a 2550:1 dilution in deionized water in a 1 cm cell.

The material IA4 (0.8 parts) was combined with Cinquasia® Magenta D 4550 J (15 parts), a 10% aqueous solution of a styrene-acrylic polymer with a reported acid number of 214 and Mw of 17,250 (15 parts), MPDiol (5 parts), and deionized water (64.2 parts) and dispersed using convention bead-milling processes with beads to yield a pigment dispersion K. This was analyzed for UV-Vis absorbance at a 2550:1 dilution in deionized water in a 1 cm cell.

Example 3

Preparation of Inkjet Inks

Inks were prepared by combining pigment dispersions as shown in example 2 with the ink ingredients below. The inks were filtered using depth filters and then measured for ink properties. Illustrative ink formulation is given in Table 1.

TABLE 1

| Components | Wt % with respect to ink formulation |
|---|---|
| Pigment Dispersion | 27.7 |
| Styrene Acrylic resin | 16.5 |
| Polyethylene emulsion | 4.0 |
| 2-Pyrrolidone | 13.7 |
| MPDiol | 7.7 |
| Phosphate ester-based surfactant | 0.20 |
| Non-ionic surfactant | 1.50 |
| Ethoxylated non-ionic fluorosurfactant | 2.60 |
| Chelator | 0.10 |
| Polyacrylic acid resin | 0.14 |
| Water | 25.86 |

Example 4

Ink Properties

Ink viscosity and particle-size were measured and the inks were tested for stability via T-cycle and ASL experiments.

T-cycle experiment: The T-cycle experiment is carried out by heating 5-50 g of ink in a small plastic bottle to 70° C. for 4 hours. The ink solution is then cooled to −40° C. and the temperature maintained for 4 hours. The cycle is repeated 4 more times. The ink solution is then warmed to ambient conditions and the final ink properties are measured (T-Cycle).

ASL experiment: The ink is stored at 60° C. for 2 weeks (2 wk ASL), and 4 weeks (4 wk ASL). The ink properties are measured after designated time intervals.

The viscosities of the inks were measured before the inks (wk 0) were subjected to T-cycle and ASL experiments. Evaluation of the viscosity was conducted in accordance with the following criteria. Since the viscosity is increased when the pigment forms an aggregation, the pigment dispersibility of a pigment dispersion having a lower viscosity is evaluated as better than excellent.
A: 90-120% of initial viscosity
B: 120-140% of initial viscosity
C: 140-160% of initial viscosity
D: >160% of initial viscosity The particle sizes of the inks formulated using the pigment dispersions were measured by dynamic light scattering method (wk 0). Since the particle size is increased when the pigment forms an aggregation, the pigment dispersibility of a pigment dispersion having a smaller average particle diameter is evaluated as better than excellent.
A: 90-110% of initial particle size
B: 80-90% or 110-120% of initial particle size
C: less than 80% or more than 120% of initial particle size.

Table 2 given below, describes the properties of Ink formulation based on pigment dispersion with or without dispersant additives. PD stands for pigment dispersions as defined in example 2.

T-cycle and ASL testing. The ink composition including dispersant additives help in suppressing the aggregation of the fine pigment particles and exhibit excellent dispersibility. The variation in viscosity and particle size is minimal after ASI study at 60° C. or T-Cycle treatment.

Example 5

Decel Performance

This test measured the effect of time on drop velocity. "Decel" is a phenomenon in which the drop velocity (DV) gets progressively lower, which can cause certain parts of the image to look lighter than others. This is believed to be due to continuous firing of the thermal ink-jet nozzle, and becoming more aggravated at higher drop ejection frequencies.

The formulated inks were filled into ink-jet print cartridges and tested to ensure that all nozzles were in working condition. The ejected drop velocity was measured as a function of time. The inks have been tested 4 times to produce a mean drop velocity and standard deviation. Table 3 illustrates the mean drop velocity and standard deviation at 45° C.

TABLE 2

| Ink ID | PD | Viscosty (cP) | | | | Nano Mv (nm) | | | | Nano 95% (nm) | | | |
|---|---|---|---|---|---|---|---|---|---|---|---|---|---|
| | | Wk0 | T-Cycle | 2 wk ASL | 4 wk ASL | Wk0 | T-Cycle | 2 wk ASL | 4 wk ASL | Wk0 | T-Cycle | 2 wk ASL | 4 wk ASL |
| 1 | A | 4.1 | B | B | C | 221 | B | B | B | 334 | B | B | C |
| 2 | B | 3.4 | A | B | B | 222 | A | A | A | 353 | A | A | A |
| 3 | C | 3.5 | C | D | D | 219 | B | C | C | 362 | A | B | C |
| 4 | D | 3.6 | B | C | D | 216 | B | B | C | 347 | A | B | C |
| 5 | E | 4.1 | B | B | B | 233 | B | B | B | 334 | B | B | B |
| 6 | F | 4.1 | B | C | C | 233 | A | B | C | 358 | B | B | B |
| 7 | G | 5.0 | A | A | B | 248 | A | B | B | 359 | B | C | C |
| 8 | H | 3.4 | A | D | D | 213 | A | C | C | 355 | A | C | C |
| 9 | I | 3.6 | A | A | B | 214 | A | A | B | 341 | A | A | A |
| 10 | J | 3.6 | A | B | B | 216 | A | B | C | 357 | A | B | B |
| 11 | K | 3.4 | A | B | C | 216 | A | B | C | 345 | A | B | C |

According to Table 2, Ink ID's 3, 4, and 7 perform poorly in ink stability tests as they do not contain dispersant additives. These dispersions exhibit substantial viscosity and particle size growth during T-cycle and ASL testing. Ink ID 4 does not contain dispersant additive but incorporates an additional pigment stabilizing surfactant, sulfonated ethoxylated tristyrl phenol, which is believed to be the principal cause of poor decel performance of the ink. The ink composition shows improved performance as compared to Ink ID's 3, and 7. However, the performance is not satisfactory. The performance of Ink ID 9 containing a dispersant additive in addition to sulfonated ethoxylated tristyrl phenol is better than Ink ID 4. Surprisingly, Ink ID's 1, 2, 5, 6, 8, 10, and 11, which have dispersant additives, show substantial reduction of viscosity rise and particle size growth during

TABLE 3

Decel performance

| Ink ID | Pigment Dispersion | Mean DV | Standard Deviation of DV |
|---|---|---|---|
| 4 | D | 8.307 | 0.563 |
| 3 | C | 9.429 | 0.321 |
| 11 | K | 10.484 | 0.141 |

As can be seen from Table 3, Ink ID 4 has a low mean DV and a high standard deviation. Removing sulfonated ethoxylated tristyrl phenol from the formulation (Ink ID 3) raises mean DV and lowers standard deviation. The ink composition (Ink ID 11) containing IA2 as a dispersant additive, raises mean DV further still and lowers standard deviation even more. Overall, the data illustrates that the addition of the dispersant additive to ink compositions results in superior decel-alleviating properties as compared to a standard ink compositions without dispersant additives. Thus, the ink composition of the present disclosure improves overall image quality.

It should be appreciated, that although the decel-alleviating components of the present disclosure were evaluated in "inks" and not clear liquids, the disclosure, as described above, is equally applicable to clear liquids.

As seen in the examples, the present disclosure can provide a pigment dispersion that exhibits a vivid color tone in which pigment is finely dispersed and the dispersion stability of the pigment is excellent even after being stored for a long term or being stored at high temperature conditions.

Further, the disclosure can provide an ink composition that exhibits high color purity due to the excellent dispersion stability of the pigment which is maintained even after the long-term storage or the repeated changes in temperature.

Other implementations of the present subject matter will be apparent from consideration of the present specification. It is intended that the present specification and examples be considered as just illustrative and as encompassing the equivalents thereof.

The invention claimed is:

1. A colored ink composition comprising:
   a dispersion medium, wherein the dispersion medium is water-based and contains at least one hydrophilic solvent;
   at least one colored pigment dispersed in the dispersion medium and imparting a color to the ink composition;
   at least one dispersant, wherein the at least one dispersant is present at from about 0.05 wt% to about 15 wt% of the ink composition;
   at least one durable polymer;
   a phosphate ester-based surfactant; and
   at least one dispersion additive, wherein the at least one dispersion additive is a quinacridone derivative according to Formula I

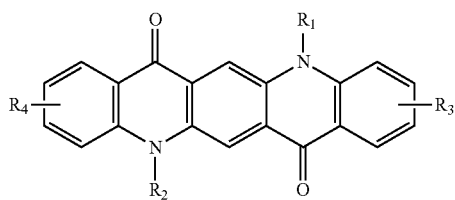

wherein $R_1$ and $R_2$ are hydrogen; $R_3$ and $R_4$ are independently selected from the group consisting of hydrogen, alkyl, halogen, carboxylic acid or salts thereof, and a group -A-B; A is selected from the group consisting of alkyl and aryl; B is selected from the group consisting of alkyl, aryl, heteroaryl, cycloalkyl, heterocycloalkyl, and -NHCOR$_5$; R$_5$ is selected from the group consisting of alkyl and aryl; wherein alkyl, aryl, heteroaryl, cycloalkyl, heterocycloalkyl, and R5 are independently further substituted or unsubstituted with alkyl, aryl, halogen, cyano, sulphonic acid or salts thereof, or carboxylic acid or salts thereof, and wherein the color of the colored ink composition is yellow, magenta, cyan, red, blue, green, violet, or orange.

2. The colored ink composition of claim 1 further comprising a wax dispersed in the dispersion medium.

3. The colored ink composition of claim 1, wherein the hydrophilic solvent content in the ink composition is from about 0.1 wt % to 30 wt %.

4. The ink of claim 1, wherein the durable polymer is selected from the group consisting of polyurethane, latex, polyurethane hybrid polymers, and combinations thereof.

5. The ink of claim 1, wherein the pigment is selected from the group consisting of quinacridone pigment, and quinacridonequinone pigment.

6. The ink of claim 1, wherein the pigment is selected from the group consisting of Pigment Orange 48, Pigment Orange 49, Pigment Red 122, Pigment Red 192, Pigment Red 202, Pigment Red 206, Pigment Red 207, Pigment Red 209, Pigment Red 282, Pigment Violet 19, Pigment Violet 42, and a mixed crystal thereof.

7. The ink of claim 2, wherein the wax is selected from the group consisting of natural wax, synthetic wax, and combinations thereof.

8. The ink of claim 1, wherein the dispersion additive is a quinacridone derivative according to Formula IA,

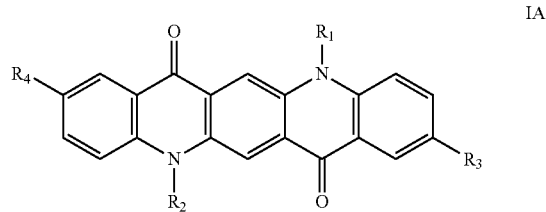

wherein $R_1$ and $R_2$ are independently hydrogen; $R_3$ and $R_4$ are independently selected from the group consisting of hydrogen, $C_{1-22}$ alkyl, halogen, carboxylic acid or salts thereof, and the group -A-B; A is selected from the group consisting of $C_{1-22}$ alkyl and $C_{6-10}$ aryl; B is selected from the group consisting of $C_{1-22}$ alkyl, $C_{6-10}$ aryl, heteroaryl, cycloalkyl, heterocycloalkyl, and -NHCOR$_5$; wherein $C_{1-22}$ alkyl, $C_{6-10}$ aryl, heteroaryl, cycloalkyl, heterocycloalkyl and R$_5$ are independently further substituted or unsubstituted with $C_{1-22}$ alkyl, $C_{6-10}$ aryl, halogen, cyano, sulphonic acid or salts thereof, carboxylic acid or salts thereof; R$_5$ is selected from the group consisting of $C_{1-22}$ alkyl and $C_{6-10}$ aryl.

9. The ink of claim 8, wherein $R_1$ and $R_2$ in the quinacridone compound according to Formula IA are independently hydrogen; $R_3$ and $R_4$ are independently the group -A-B; A is selected from the group consisting of $C_{1-22}$ alkyl and $C_{6-10}$ aryl; B is selected from the group consisting of $C_{1-22}$ alkyl, $C_{6-10}$ aryl, heteroaryl, cycloalkyl, heterocycloalkyl, and -NHCOR$_5$; wherein $C_{1-22}$ alkyl, $C_{6-10}$ aryl, heteroaryl, cycloalkyl, heterocycloalkyl and R$_5$ are independently further substituted or unsubstituted with $C_{1-22}$ alkyl, $C_{6-10}$ aryl, halogen, cyano, sulphonic acid or salts thereof, carboxylic acid or salts thereof; R$_5$ is selected from the group consisting of $C_{1-22}$ alkyl and $C_{6-10}$ aryl.

10. The ink of claim 8, wherein the dispersion additive has a structure represented by any of the following general Formulas IA1 and IA2

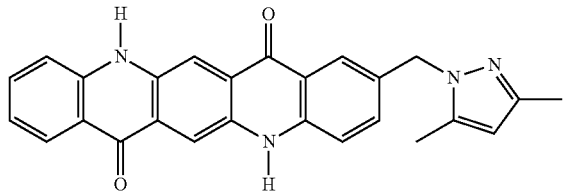

IA1

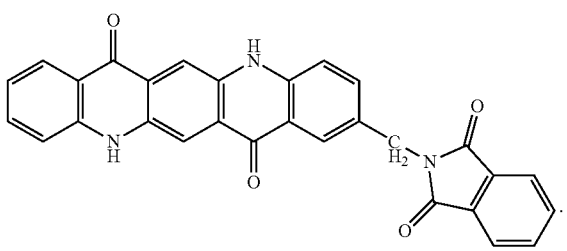

IA2

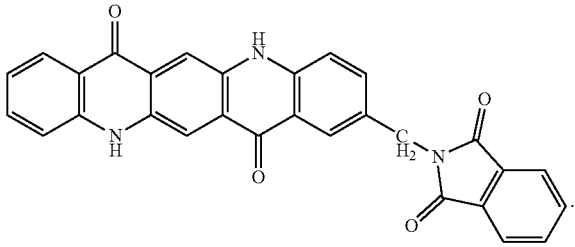

IA2

11. The ink of claim 1, wherein the pigment content with respect to the ink composition is from about 0.3 wt % to 20 wt %.

12. The ink of claim 1, wherein the ink composition has from 90% to 140% of initial viscosity after 2 week accelerated shelf life study at 60° C. or T-cycle treatment.

13. The ink of claim 1, wherein the ink composition has from 80% to 120% of initial particle size after 2 week accelerated shelf life study at 60° C. or T-cycle treatment.

14. The colored ink composition of claim 1, wherein the dispersion additive is present in an amount from 0.5 wt% to 15 wt% of the ink composition.

15. The colored ink composition of claim 1, wherein the water content in the ink composition is from about 50 wt % to 80 wt %, and the hydrophilic solvent content in the ink composition is from about 0.1 wt % to 30 wt %.

16. The colored ink composition of claim 1, wherein the hydrophilic solvent comprises 2-methyl-1,3-propanediol.

17. An ink composition comprising:
a dispersion medium, wherein the dispersion medium is water-based and contains at least one hydrophilic solvent;
at least one pigment dispersed in the dispersion medium;
at least one dispersant, wherein the at least one dispersant is present at from about 0.05 wt% to about 15 wt% of the ink composition;
at least one durable polymer; and
at least one dispersion additive, wherein the at least one dispersion additive is a quinacridone derivative according to Formula IA2:

18. The ink composition of claim 17, wherein the color of the ink composition is yellow, magenta, cyan, red, blue, green, violet, or orange.

19. The ink composition of claim 17, further comprising a wax dispersed in the dispersion medium.

20. The ink composition of claim 19, wherein the wax is selected from the group consisting of natural wax, synthetic wax, and combinations thereof.

21. The ink composition of claim 17, wherein the water content in the ink composition is from about 50 wt % to 80 wt %, and the hydrophilic solvent content in the ink composition is from about 0.1 wt % to 30 wt %.

22. The ink composition of claim 17, wherein the hydrophilic solvent comprises 2-methyl-1,3-propanediol.

23. The ink composition of claim 17, wherein the hydrophilic solvent content in the ink composition is from about 0.1 wt % to 30 wt %.

24. The ink composition of claim 17, wherein the durable polymer is selected from the group consisting of polyurethane, latex, polyurethane hybrid polymers, and combinations thereof.

25. The colored ink composition of claim 17, wherein the pigment is selected from the group consisting of quinacridone pigment, and quinacridonequinone pigment.

26. The ink composition of claim 17, wherein the pigment is selected from the group consisting of Pigment Orange 48, Pigment Orange 49, Pigment Red 122, Pigment Red 192, Pigment Red 202, Pigment Red 206, Pigment Red 207, Pigment Red 209, Pigment Red 282, Pigment Violet 19, Pigment Violet 42, and a mixed crystal thereof.

27. The ink composition of claim 17, wherein the ink composition has from 90% to 140% of initial viscosity after 2 week accelerated shelf life study at 60° C. or T-cycle treatment.

28. The ink composition of claim 17, wherein the ink composition has from 80% to 120% of initial particle size after 2 week accelerated shelf life study at 60° C. or T-cycle treatment.

29. The ink composition of claim 17, wherein the dispersion additive is present in an amount from 0.5 wt% to 15 wt% of the ink composition.

* * * * *